United States Patent

West

[11] Patent Number: 5,915,407
[45] Date of Patent: Jun. 29, 1999

[54] BALL WITH INFLATION VALVE SLEEVE FOR RAPID DEFLATION

[75] Inventor: John West, Ashland, Ohio

[73] Assignee: The National Latex Products Company, Ashland, Ohio

[21] Appl. No.: 09/098,080

[22] Filed: Jun. 16, 1998

[51] Int. Cl.⁶ .................................................. F16K 15/20
[52] U.S. Cl. ........................ 137/223; 446/220; 446/224
[58] Field of Search .................................. 446/220, 224; 137/223, 234.5, 454.2

[56] References Cited

U.S. PATENT DOCUMENTS

| | | | |
|---|---|---|---|
| 2,183,900 | 12/1939 | Voit et al. ................................ | 137/223 |
| 2,731,028 | 1/1956 | McCord . | |
| 2,737,969 | 3/1956 | Iknayan . | |
| 2,841,166 | 7/1958 | Auzin . | |
| 3,100,498 | 8/1963 | Gibson, Jr. ............................. | 137/223 |
| 3,310,064 | 3/1967 | Voos ...................................... | 137/234.5 |
| 3,401,714 | 9/1968 | Scott . | |
| 3,410,299 | 11/1968 | Whittington . | |
| 3,584,671 | 6/1971 | Kampa ................................. | 137/223 X |
| 3,905,387 | 9/1975 | Grant . | |
| 4,014,048 | 3/1977 | Rappleyea . | |
| 4,274,633 | 6/1981 | Benscher . | |
| 5,083,581 | 1/1992 | Jaw . | |
| 5,090,223 | 2/1992 | Ruffler ................................. | 137/223 X |
| 5,167,561 | 12/1992 | Rizzo .................................... | 446/224 |
| 5,358,001 | 10/1994 | Smith . | |

FOREIGN PATENT DOCUMENTS

| | | | |
|---|---|---|---|
| 94915 | 10/1959 | Norway ................................. | 137/223 |
| 1899 | 2/1899 | United Kingdom .................. | 137/223 |
| 11611 | 5/1903 | United Kingdom .................. | 137/223 |
| 11378 | 6/1983 | United Kingdom .................. | 137/223 |

*Primary Examiner*—John Rivell
*Assistant Examiner*—Meredith H. Schoenfeld
*Attorney, Agent, or Firm*—Oldham & Oldham Company, LPA

[57] ABSTRACT

A ball, inflatable with a gas using an inflation needle, has a substantially hollow gas-impervious skin with an aperture to allow passage of inflation air. A valve member is selectively seatable in the aperture for retaining the gas and allowing insertion of the inflation needle threrethrough and removable from the aperture to allow rapid release of the inflation gas. A radial flange formed at one end of the valve member allows for easy insertion and removal of the valve member from the aperture.

17 Claims, 3 Drawing Sheets

BALL WITH INFLATION VALVE SLEEVE FOR RAPID DEFLATION

The present invention relates to a ball having an inflation valve. More particularly, the present invention relates to such a ball having an inflation valve where the valve is seated in a sleeve which is removably positioned in an aperture in the ball. The invention provides an easy removal of the sleeve from the ball, permitting the inflation pressure of the ball to be quickly relieved, deflating the ball.

BACKGROUND OF THE INVENTION

It is known in the prior art to provide inflated playballs or sports balls which are selectively inflatable. In one type of inflated ball, the inflation is accomplished at the factory through an inflation valve and further inflation or adjustment of the inflation pressure is simply not possible. There are also at least two types of balls in which the ball may be inflated at the factory (although this is not necessary) and the inflation pressure in the ball may be selectively adjusted upwardly or downwardly at the time of use. In the first of these two types, a nozzle is provided through which inflation air may be blown and a plug which fits into the nozzle may be used to hold the inflation in the ball. This is seen typically in thin-skinned balls, such as beach balls and the like, and an example of this type of nozzle is described in U.S. Pat. No. 5,083,581. In the second of the two types, an inflation valve is permanently seated in or affixed to the ball. This inflation valve is usually elastomeric and is suitable for receiving an inflation needle for injecting pressurized air from an air pump or the like. An example of this type of inflation valve is shown in U.S. Pat. No. 4,274,633.

The inflation valves of the type known in the prior art each have shortcomings. The nozzle type of inflation valve permits easy deflation of the pressurization in the ball, but it tends to be prone to leaks and inadvertent releases of the pressurization. The valve which requires a needle to inflate holds the pressure nicely, but it is difficult to release the pressurization quickly, particularly without the inflation needle.

With large balls, particularly balls which are similar to beach balls in size or even larger, whether used as a playball or a piece of exercise equipment, there is often a need or at least a desire to be able to rapidly deflate the ball. In some cases, the need is to be able to pass the ball through a door or similar opening. In another case, the desire is to be able to deflate the ball so that it may be more conveniently stored. It is therefore an advantage of the present invention to provide an inflation assembly for a playball or the like which has a inflation valve for receiving an inflation needle, but which also allows for rapid deflation of the playball or the like.

SUMMARY OF THE INVENTION

This and other advantages of the present invention are provided by an inflation/deflation device which is removably seatable in an aperture of a gas-retaining ball. Such a device is seated in the aperture to allow inflation by an inflation needle and removable to allow rapid deflation of the ball. The device comprises a generally rigid sleeve having a central channel therethrough and a generally flexible inflation valve seated in the central channel of the sleeve. The valve has a passageway therethrough for inserting the inflation needle. A flange formed at an end of the sleeve assists in insertion and removal of the device from the aperture. The valve comprises an elongate valve body provided with means for seating the valve body in the central channel in an air-tight fit.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
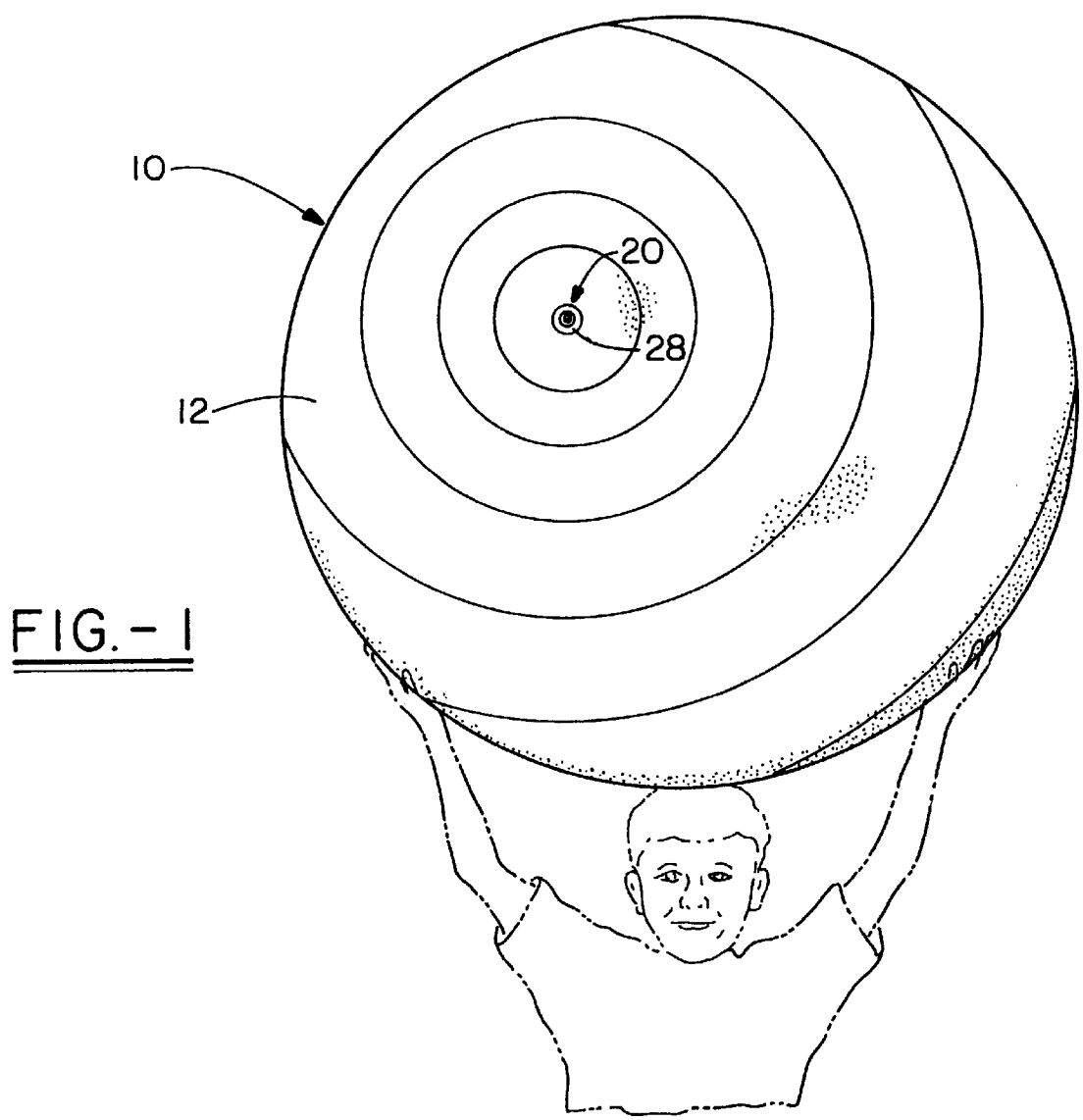
FIG. 1 shows a perspective view of a ball having the inflation valve sleeve of the present invention.
Figure 2:
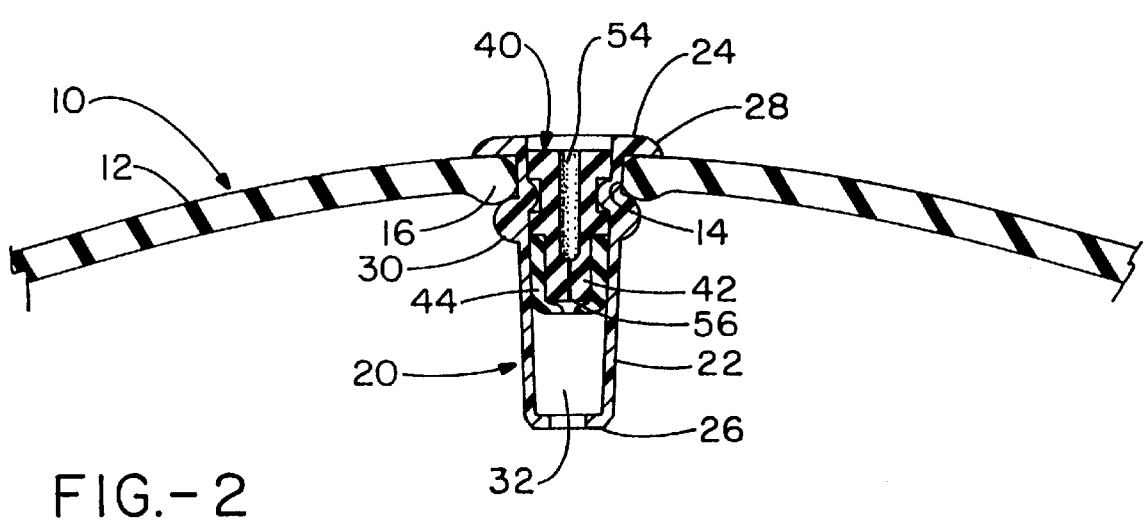
FIG. 2 shows an enlarged partial side sectional view of a first embodiment ball having the inflation valve sleeve.

An inflated ball 10 of the present invention is shown in perspective in FIG. 1, with the important elements shown in an enlarged partial side sectional view in FIG. 2. A portion of an inflated ball 10 is represented by the depiction of the air-retaining skin 12. Inflated balls may be generally divided into two categories: balls which have a separate air-retaining bladder internal to the outer skin and balls in which the outer skin is the air-retaining bladder. An example of the first type of ball is a leather American-type football as used in National Football League competition, while a basketball, even one of the type used in NCAA and National Basketball League competitions, is an example of a ball in which the outer skin provides the ball with its air-retaining capacity. As will be understood as the invention is explained, the balls 10 with which the present invention is most useful will almost inevitably be balls which do not contain a separate air-retaining bladder internal to the outer skin. The particular ball 10 illustrated in FIG. 1 is a large playball or exercise ball. Some of these balls will be on the order of three feet in diameter.

Figure 2A:
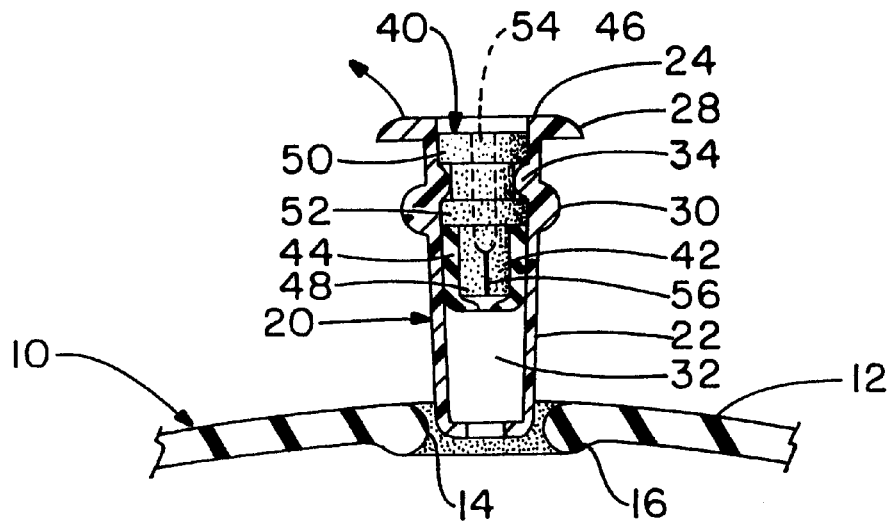
FIG. 2A shows an enlarged partial side sectional view of the first embodiment ball with the inflation valve sleeve being removed to allow rapid deflation.

Referring now to FIGS. 2 and 2A, an inflation hole 14 is provided in the skin 12 to allow inflation air to be injected into the interior of the ball. Such an inflation hole 14 is found in balls with and without a separate internal bladder. In a ball with an internal bladder, the hole simply provides an access port through which an inflation valve may project, as is shown in U.S. Pat. No. 4,274,633, issued to Benscher on Jun. 23, 1981. In a ball lacking a separate internal bladder, the hole 14 in the ball will almost always have the valve means securely affixed so that the valve means is not readily separable. Since the hole 14 is often the product of a manufacturing process which involves either a molten liquid or a latex emulsion, it is quite preferred to provide a slightly thickened lip or bead 16 around the circumference of the hole to provide additional strength against tearing of the skin which could originate at the hole. In any case, there should not be any substantial thinning of the skin at the hole circumference. The preferred hole 14 is round, although this is not required.

Insertable into the hole 14 is a valve member 20. Valve member 20 generally has a rigid sleeve 22 with distinct first and second ends 24, 26. The first end 24 is characterized by a radial flange 28 which has a diameter larger than the diameter of the hole 14. As shown in FIG. 2, rigid sleeve 22 has a generally constant outside diameter, although in some embodiments the outside diameter of the rigid sleeve will decrease as one moves from the first end 24 to the second end 26. In these latter embodiments, the decrease in diameter may impart a slightly conate appearance to sleeve 22 and facilitate placement of the valve member into hole 14. The outside surface of the sleeve 22 will generally be smooth, although some embodiments may have a slight radial enlargement 30 near the first end 24. The overall purpose of the outside surface of sleeve 22 is to frictionally retain the sleeve in hole 14, so the outside diameter of the sleeve, at least near the first end 24, will be slightly larger than the diameter of the hole. If the hole 14 has a bead or lip 16, the preferred distance between the radial flange 28 and the radial enlargement 30 will be slightly larger than the bead or lip. The radial flange 28 is intended to prevent the valve member 20 from being pushed inside the ball and the radial enlargement 30 is intended to prevent the valve member from being easily dislodged from the hole 14. As will be easily observed in FIG. 1, the sleeve 22 has a length which is several times larger than the thickness of the skin 12 of the ball 10. Radial flange 28 provides a finger grip for removing the valve member from the hole 14.

Sleeve 22 has a generally smooth channel 32 running from first end 24 to second end 26, although an area of slightly decreased diameter 34 may be provided in the preferred embodiments.

Figure 3:
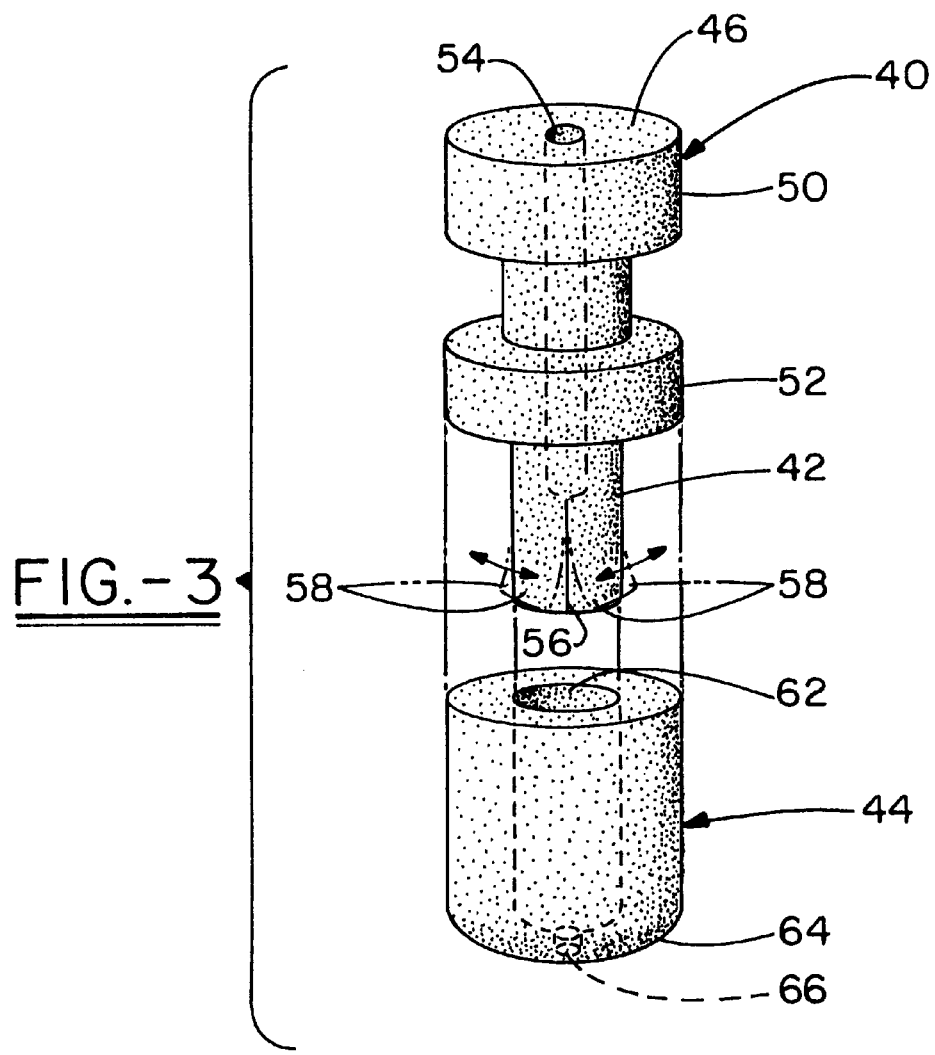
FIG. 3 shows an enlarged exploded view of the preferred inflation valve of the present invention.
Figure 4:
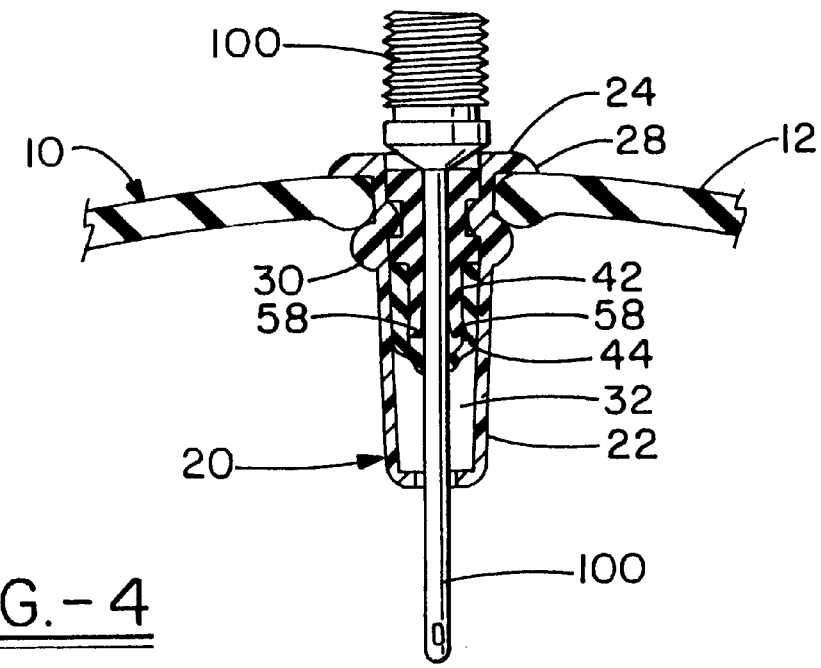
FIG. 4 shows an enlarged partial side sectional view of the first embodiment ball, being inflated by an inflation needle.

Inserted into channel 32 is an elastomeric inflation valve 40, which is shown isolated from the valve member in FIG. 3. While many of the conventional inflation valves can either be use as is or may be readily adapted for use in the valve member, the preferred embodiment of the inflation valve 40 will now be described. The preferred elastomeric inflation valve 40 comprises two distinct members, the first member being valve body 42 and the second member being valve end cap 44. Valve body 42 is a generally cylindrical elongate member made of an elastomeric material, such as a natural or synthetic rubber. Valve body 42 has a first end 46 and a second end 48. A first radial enlargement 50 is located at the first end 46 and a second radial enlargement 52 is positioned along the valve body near the first end. The spacing of the first and second radial enlargements 50, 52 from each other is consistent with the size of the area of slightly decreased diameter 34 in channel 32 of sleeve 22, and the outside diameter of the radial enlargements 50, 52 is the same as or slightly larger than the inside diameter of channel 32. A placement of inflation valve 40 into channel 32 of valve member 20 results in a firm frictional mating of the parts, resulting in an airtight fit. A circular passageway 54 for receiving a conventional inflation needle 100 starts at the first end 46 of valve body 42 and proceeds axially along the valve body at least as deep as the second radial enlargement 52, although the circular passageway does not extend all the way to the second end 48. As will be known to those of skill in the art, the inflation needle 100 is rigid, typically formed from metal. One will commonly wet the exterior of the needle 100 with water or another lubricant to assist the insertion of the needle into the passageway 54. Starting at the second end 48 and extending into the valve body 42 towards the first end is a longitudinal cut 56 passing through the axis of the valve body. This longitudinal cut 56 effectively divides the second end 48 into a pair of separable semicylindrical flaps 58. The longitudinal cut 56 extends far enough into the valve body so that the cut meets the circular passageway 54, resulting in a channel 60 which extends through the entire length of the valve body. The outside diameter of the valve body along its length from the second radial enlargement to the second end 48 is smaller than the inside diameter of the sleeve channel 32 of sleeve 22. When a conventional inflation needle is inserted into the passageway 54 at first end 46 and moves along valve body channel 60 beyond the point where passageway 54 meets longitudinal cut 56, the end of the needle forces the pair of separable semicylindrical flaps 58 radially apart. In this manner, an air injection pathway is established through the valve body 42 inside the inflation needle 100. When the inflation needle 100 is removed from the valve body channel 60, the pair of separable semicylindrical flaps 58 return to a mating position. Comparison of FIGS. 2 and 4 shows the invention without the needle 100 inserted and with the needle inserted.

Valve end cap 44 is a thin elastomeric sleeve member with a first open end 62 and a generally closed second end 64. Valve end cap 44 is sized to slidingly fit over the second end 48 of valve body 42. When this is done, the sleeve of end cap 44 provides a girdle around the second end 48 of the valve body, so that the end cap assists in urging the pair of separable semicylindrical flaps 58 back into a mating position which effectively closes valve body channel 60 when no inflation needle is present in the channel. A small aperture 66 in the generally closed second end allows air entering the valve body 42 through an inflation needle to pass freely into the interior of the ball.

It will at this point be understood that the inflation of the ball 10 using the inflation needle and an associated air pump or compressed air supply (not shown) will not be noticeably different from that when the inflation needle is used with balls as known in the prior art. However, in those prior art balls, the inflation valves are permanently anchored in the skin 12 of the ball and may even be molded into the skin. Because of this, the ball must be deflated using the inflation needle, and this process tends to be almost as slow as the process of inflating the ball, due to the narrow constriction provided inside the inflation needle. As shown in FIGS. 2 and 2A, the rigid sleeve 22 employed in the present invention has an externally positioned flange which allows the valve member 20 to be grasped by the thumb and finger of a user and quickly extracted from the hole 14. Once the valve member is removed, deflation of the ball through hole 14 occurs at a much faster speed. This speed of deflation is particularly desirable in large diameter balls, which may be so large that they cannot be easily passed through doorways and the like while inflated.

Figure 5:
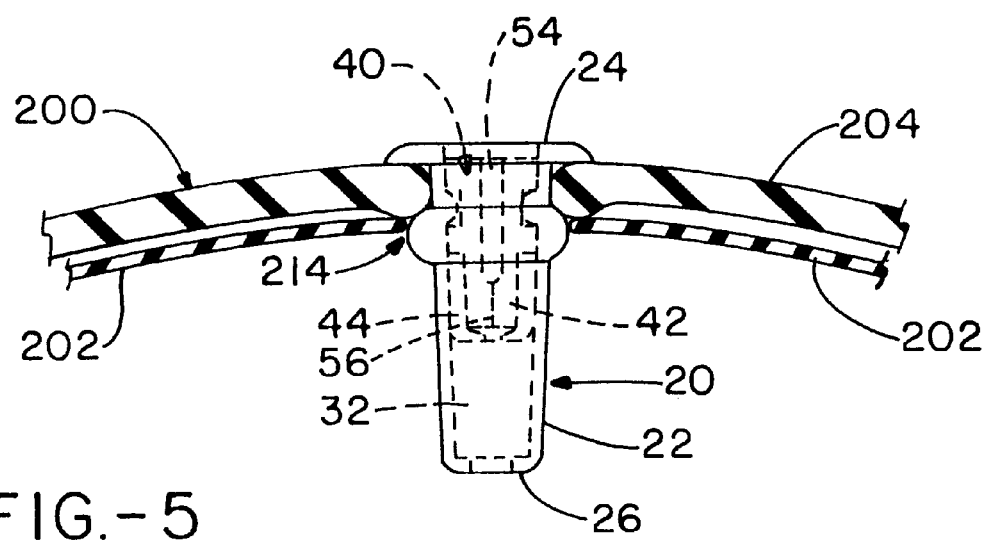
FIG. 5 shows an enlarged partial side sectional view of a second embodiment of the present invention.

The present invention is not generally useful with a ball having a separate internal air-retaining bladder, since the inflation valve in such a ball must generally be permanently affixed to the bladder. There is one situation where the valve member 20 of the present invention could be effectively used, as shown in FIG. 5. If a ball 200 having a separate internal air-retaining bladder 202 has the bladder permanently affixed to the inside of the skin 204 of the ball around a hole 214, the valve member 20 may be selectively inserted in the hole as shown.

The materials from which the parts of the present invention may be manufactured will be largely of design choice to the manufacturer, within certain limitations. The valve body 42 will be manufactured from an elastomeric material, and the preferred materials at this time would include crosslinked natural and synthetic rubbers, with the more common option being a synthetic rubber. The valve end cap 44 is preferably formed from a thin elastomeric material, such as a rubber or a polyurethane, which can be formed by a process of dipping a shaped mandrel into a elastomercontaining latex, in a manner similar to the production of a variety of thin elastomeric materials, including balloons, gloves, and condoms. Alternately, valve end cap 44 may be a somewhat thicker elastomeric sleeve as would be cut from a short length of an elastomeric tubing and frictionally fitted over the portion of valve body 42 having the longitudinal cut 56 to normally hold the flaps 58 together. The rigid sleeve 22 is most preferably formed from a molding process, particularly an injection molding. The preferred materials would include polypropylene, polyethylene, polyurethanes, polystyrene and the like.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A ball, inflatable with a gas using an inflation needle, comprising:

a substantially hollow gas-impervious skin having an aperture therein to allow passage of inflation air;

a valve member, selectively seatable in the aperture for retaining the gas and allowing insertion of the inflation needle therethrough and removable from the aperture to allow release of the inflation gas;

wherein the valve member comprises a generally rigid sleeve having a central channel therethrough and a generally flexible inflation valve seated in the central channel of the sleeve, the valve having a passageway therethrough for inserting the inflation needle.

2. The ball of claim 1 wherein the aperture has a thickened lip around the periphery of the aperture.

3. The ball of claim 1 wherein the valve member has a flange formed at an end of the sleeve.

4. The ball of claim 3 wherein the flange has a diameter larger than that of the aperture.

5. The ball of claim 3 wherein the sleeve has a slight radial enlargement near the flange to assist in retaining the valve member in the aperture.

6. The ball of claim 1 wherein the valve comprises an elongate valve body provided with means for seating the valve body in the central channel in an air-tight fit.

7. The ball of claim 6 wherein the means for seating the valve body comprises a first and a second radial enlargement on the valve body and a area of slightly decreased diameter in the channel.

8. The ball of claim 6 wherein the passageway through the valve is provided by a circular channel starting at one end of the valve body and proceeding axially therealong and a longitudinal cut passing through the axis of the valve body so that the channel and the cut form a continuous passageway.

9. The ball of claim 8 wherein the cut effectively divides an end of the valve body into a pair of semicylindrical flaps.

10. The ball of claim 9 wherein a valve end cap is frictionally fitted over the pair of flaps to hold them in a closed position.

11. A device for inflating with an inflation needle a gas-retaining ball having an aperture, comprising:

a generally rigid sleeve having a central channel therethrough; and a generally flexible inflation valve seated in the central channel of the sleeve, the valve having a passageway therethrough for inserting the inflation needle;

wherein the sleeve is removably seatable in the aperture.

12. The device of claim 11 wherein the device has a flange formed at an end of the sleeve.

13. The device of claim 12 wherein the flange has a diameter larger than that of the aperture.

14. The device of claim 12 wherein the sleeve has a slight radial enlargement near the flange to assist in retaining the device in the aperture.

15. The device of claim 11 wherein the valve comprises an elongate valve body provided with means for seating the valve body in the central channel in an air-tight fit.

16. The device of claim 15 wherein the means for seating the valve body comprises a first and a second radial enlargement on the valve body and an area of slightly decreased diameter in the channel.

17. The device of claim 15 wherein the passageway through the valve is provided by a circular channel starting at one end of the valve body and proceeding axially therealong and a longitudinal cut starting at the opposite end of the valve body and passing through the axis of the valve body so that the channel and the cut form a continuous passageway.

* * * * *